US009306667B2

(12) United States Patent
Jovicic et al.

(10) Patent No.: US 9,306,667 B2
(45) Date of Patent: Apr. 5, 2016

(54) METHOD AND APPARATUS FOR POWER-EFFICIENT JOINT DIMMING AND VISIBLE LIGHT COMMUNICATION

(71) Applicant: QUALCOMM Incorporated, San Diego, CA (US)

(72) Inventors: Aleksandar Jovicic, Jersey City, NJ (US); Thomas Joseph Richardson, South Orange, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/185,836

(22) Filed: Feb. 20, 2014

(65) Prior Publication Data
US 2014/0241730 A1   Aug. 28, 2014

Related U.S. Application Data

(60) Provisional application No. 61/767,952, filed on Feb. 22, 2013.

(51) Int. Cl.
*H04B 10/116* (2013.01)
*H04L 7/00* (2006.01)
(52) U.S. Cl.
CPC ............ *H04B 10/116* (2013.01); *H04L 7/0075* (2013.01)
(58) Field of Classification Search
CPC ...................................................... H04B 10/116
See application file for complete search history.

(56) References Cited

U.S. PATENT DOCUMENTS

| | | | |
|---|---|---|---|
| 2009/0110405 A1 | 4/2009 | Lee et al. | |
| 2010/0034540 A1 | 2/2010 | Togashi | |
| 2011/0026917 A1 | 2/2011 | Li et al. | |
| 2011/0069962 A1* | 3/2011 | Castor et al. | 398/115 |
| 2013/0214699 A1* | 8/2013 | Jonsson | F21V 3/00 315/297 |
| 2013/0266325 A1 | 10/2013 | Giustiniano et al. | |
| 2014/0308048 A1* | 10/2014 | Roberts et al. | 398/187 |

FOREIGN PATENT DOCUMENTS

WO   2006079199 A1   8/2006

OTHER PUBLICATIONS

International Search Report and Written Opinion—PCT/US2014/017636—ISA/EPO—Jun. 3, 2014.
(Continued)

*Primary Examiner* — Shi K Li
*Assistant Examiner* — Mina Shalaby
(74) *Attorney, Agent, or Firm* — Arent Fox LLP

(57) ABSTRACT

A method, an apparatus, and a computer program product for communication are provided. The apparatus obtains a message for communication using visible light communication (VLC) through a light emitting diode (LED) luminary device and formats the message using a synchronization signal followed by one or more data signals. The synchronization signal and/or the one or more data signals are modulated using a Frequency Shift Keying (FSK) modulation scheme. The apparatus further receives a dimming level value associated with a brightness of light to be emitted from the LED luminary device, generates a waveform with frequencies based on the formatted message and a duty cycle for the LED luminary device based on the dimming level value, and sends the generated waveform to the LED luminary device for communication using VLC.

25 Claims, 9 Drawing Sheets

(56) References Cited

OTHER PUBLICATIONS

Rajagopal S., et al., "IEEE 802.15.7 Visible light communication: Modulation Schemes and Dimming Support," IEEE Communications Magazine, vol. 50 (3), Mar. 2012, pp. 72-82, XP011429627.

Sugiyama H., et al., "Experimental Investigation of Modulation Method for Visible-Light Communications," IEICE Transactions Communication, Dec. 1, 2006, vol. E89-B (12), pp. 3393-3400, XP001505260.

* cited by examiner

METHOD AND APPARATUS FOR POWER-EFFICIENT JOINT DIMMING AND VISIBLE LIGHT COMMUNICATION

CROSS-REFERENCE TO RELATED APPLICATION(S)

This application claims the benefit of U.S. Provisional Application Ser. No. 61/767,952, entitled "METHOD AND APPARATUS FOR POWER-EFFICIENT JOINT DIMMING AND VISIBLE LIGHT COMMUNICATION" and filed on Feb. 22, 2013, which is expressly incorporated by reference herein in its entirety.

BACKGROUND

The present disclosure relates generally to communication systems, and more particularly, to power-efficient joint dimming and visible light communication (VLC).

VLC is a method of communication using modulation of a light intensity emitted by a light emitting diode (LED) luminary device. Visible light is light having a wavelength in a range that is visible to the human eye. The wavelength of the visible light is in the range of 380 to 780 nm. Since humans cannot perceive on-off cycles of a LED luminary device above a certain number of cycles per second (e.g., 150 Hz), LEDs may use Pulse Width Modulation (PWM) in order to increase the lifespan thereof and save energy. Additionally, dimming control of the LED luminary device may be controlled through varying duty cycle timing. Such varying may affect attempts to communicate data using VLC in an environment in which the LED luminary device also has a dimming control.

Thus, improved apparatus and methods for providing power-efficient joint dimming and VLC may be desired.

SUMMARY

In aspect of the disclosure, a method, a computer program product, and an apparatus are provided. The apparatus obtains a message for communication using visible light communication (VLC) through a light emitting diode (LED) luminary device and formats the message using a synchronization signal followed by one or more data signals, wherein the synchronization signal and/or the one or more data signals are modulated using a Frequency Shift Keying (FSK) modulation scheme. The apparatus further receives a dimming level value associated with a brightness of light to be emitted from the LED luminary device, generates a waveform with frequencies based on the formatted message and a duty cycle for the LED luminary device based on the dimming level value, and sends the generated waveform to the LED luminary device for communication using VLC.

In another aspect of the disclosure, the apparatus receives a visible light communication (VLC) based signal from a light emitting diode (LED) luminary device, detects a synchronization signal in the VLC based signal through correlation with one or more stored synchronization signal replicas, and decodes a message included in the VLC based signal based on the detected synchronization signal, wherein the message is formatted using the synchronization signal followed by one or more data signals, and wherein the synchronization signal and/or the one or more data signals are modulated using a Frequency Shift Keying (FSK) modulation scheme.

DETAILED DESCRIPTION

Figure 1:
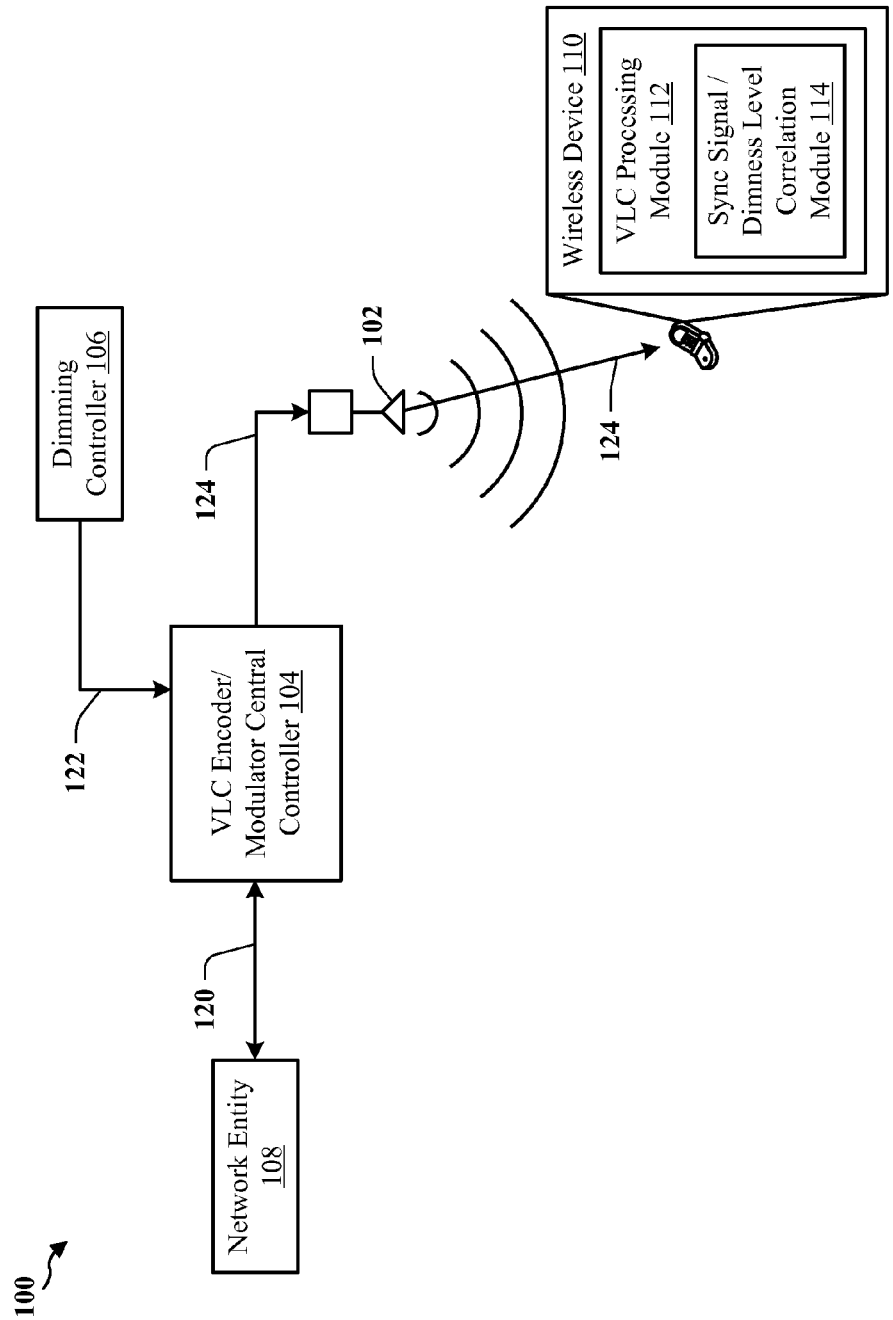
FIG. 1 is a drawing of a visible light communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a drawing of an example visible light communications system 100. The visible light communications system 100 includes one or more wireless devices 110 and one or more light emitting diode (LED) luminary devices 102. The visible light communications system 100 may overlap with one or more other communications systems, such as for example, a wireless wide area network (WWAN) supported by a network entity 108. LED luminary device 102 may be connected to a visible light communication (VLC) modulator/encoder central controller 104. Further, the VLC modulator/encoder central controller 104 may be coupled to a dimming controller 106 and the network entity 108. Dimming controller 106 may have a wireline and/or wireless interface to receive dimming commands 122 from an external device, network, etc.

In an aspect, the VLC modulator/encoder central controller 104 may receive data 120 from the network entity 108 and a dimming level input 122 from a dimming controller 106. For example, the data may be a MAC address that uniquely identifies a location (e.g., room in a building, venue, etc.). Based on these inputs (120, 122), the VLC modulator/encoder central controller 104 may generate a signal 124 that is sent to the LED luminary device 102 for communication using VLC. In such an aspect, the VLC modulator/encoder central controller 104 may generate the signal 124 with a duty cycle square wave based on the dimness level input 122 and a frequency based on the data 120. In an aspect in which the LED luminary device 102 is a direct current (DC) powered device, the signal 124 may be communicated via a DC category (CAT) cable from the VLC modulator/encoder central controller 104 to the LED luminary device 102. In another aspect where the LED luminary device 120 is an alternating current (AC) powered device, the LED luminary device 102 may have an external dimming pin, the function of which is to receive a dimming signal. This dimming signal may traditionally be a pulse-width modulated (PWM) "On-Off" signal just as in the case of the DC-architecture. In such an aspect, the output 124 of the VLC modulator/encoder central controller 104 feeds into the dimming pin of the LED luminary device 102.

In an aspect, the VLC modulator/encoder central controller 104 may use a Frequency Shift Keying (FSK) modulation scheme. In such an aspect, the signal 124 from the VLC modulator/encoder central controller 104 to the LED luminary device 102 may be a square wave whose frequency is used to convey the information 120. FSK modulation may be efficiently implemented using square waves. For example, when FSK modulation is used with the LED luminary devices 102, a high degree of power efficiency (e.g., over 80% for voltages of interest) may result. Furthermore, PWM-modulated square waves may be generally used for dimming the LED luminary device 102. Additionally, FSK modulation may be used because of constraints that an image sensor receiver may impose. One such constraint may be that the modulation is to be robust for arbitrary locations of the VLC source. A FSK symbol duration may be equal to a frame time interval.

Although FIG. 1 depicts the VLC modulator/encoder central controller 104, the dimming controller 106, the network entity 108, and the LED luminary device 102 as separate modules, one of ordinary skill in the art would appreciate that any combination of these modules may be coupled and/or housed within a single device. For example, the VLC modulator/encoder central controller 104 may be a standalone unit that contains the message 124 to be transmitted. In another example, the VLC modulator/encoder central controller 104 may be connected, via a wireline or a wireless link, to the network entity 108 and/or a device from which the VLC modulator/encoder central controller 104 receives data 120 to be communicated. In an aspect, the network entity 108 may be the Internet, an intranet, a LAN, etc. In another example, the VLC modulator/encoder central controller 104 and the dimming controller 106 may be separate devices. In another example, the VLC modulator/encoder central controller 104 and the dimming controller 106 may be co-located within the LED luminary device 102. In such an aspect, the VLC modulator/encoder central controller 104 may have a power-line communication (PLC) interface to an external network (e.g., the network entity 108) from which it may receive messages 120. In still another example, the VLC modulator/encoder central controller 104 may be a standalone device, not connected to the network entity 108, and may internally include in a memory storage the data to be communicated through the LED luminary device 102.

Wireless device 110 may include a VLC processing module 112 and a sync signal/dimness level correlation module 114. In an aspect, the VLC processing module 112 may include a receiver, such as but not limited to, a CMOS imaging sensor camera which implements a rolling shutter. In an operational aspect, the wireless device 110 may receive a signal 124 from the LED luminary device 102. In such an aspect, the sync signal/dimness level correlation module 114 may be used to determine a dimness level value in the received signal 124. Further, once the dimness level value in the received signal 124 is determined, the VLC processing module 112 may determine a synchronization signal in the received signal 124, and as such, may process the data 120 included in the received signal 124. In an operational aspect, the wireless device 110 receiver may detect a synchronization signal in a VLC signal by correlating received samples from a CMOS image sensor with stored replicas of a prior known synchronization signal. Because a chirp signal may have good autocorrelation properties, the receiver may be able to detect a start time of a FSK symbol sequence and align a fast Fourier transform (FFT) operation accordingly. Further, as the wireless device 110 may not know the dimness level a priori, the sync signal/dimness level correlation module 114 may correlate the received signal with several versions of the stored synchronization signal replicas (e.g., different replicas for different dimness levels). In an aspect, the number of dimness levels may be less than 100. In another aspect, the VLC processing module 112 may perform autocorrelation in the frequency domain to optimize the speed.

The wireless device 110 may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology.

Communications 120 between the VLC modulator/encoder central controller 104 and the network entity 108 may be supported via wireline and/or wireless systems. In an aspect, the wireline connection may be based on a power line communication (PLC), Ethernet, etc. In another aspect, the wireless connection may use a wireless peer-to-peer communication system based on FlashLinQ, WiMedia, Bluetooth, ZigBee, or Wi-Fi based on the IEEE 802.11 standard. In still another aspect, the wireless connection may be use cellular communication systems such as but not limited to, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE) systems.

Figure 2:
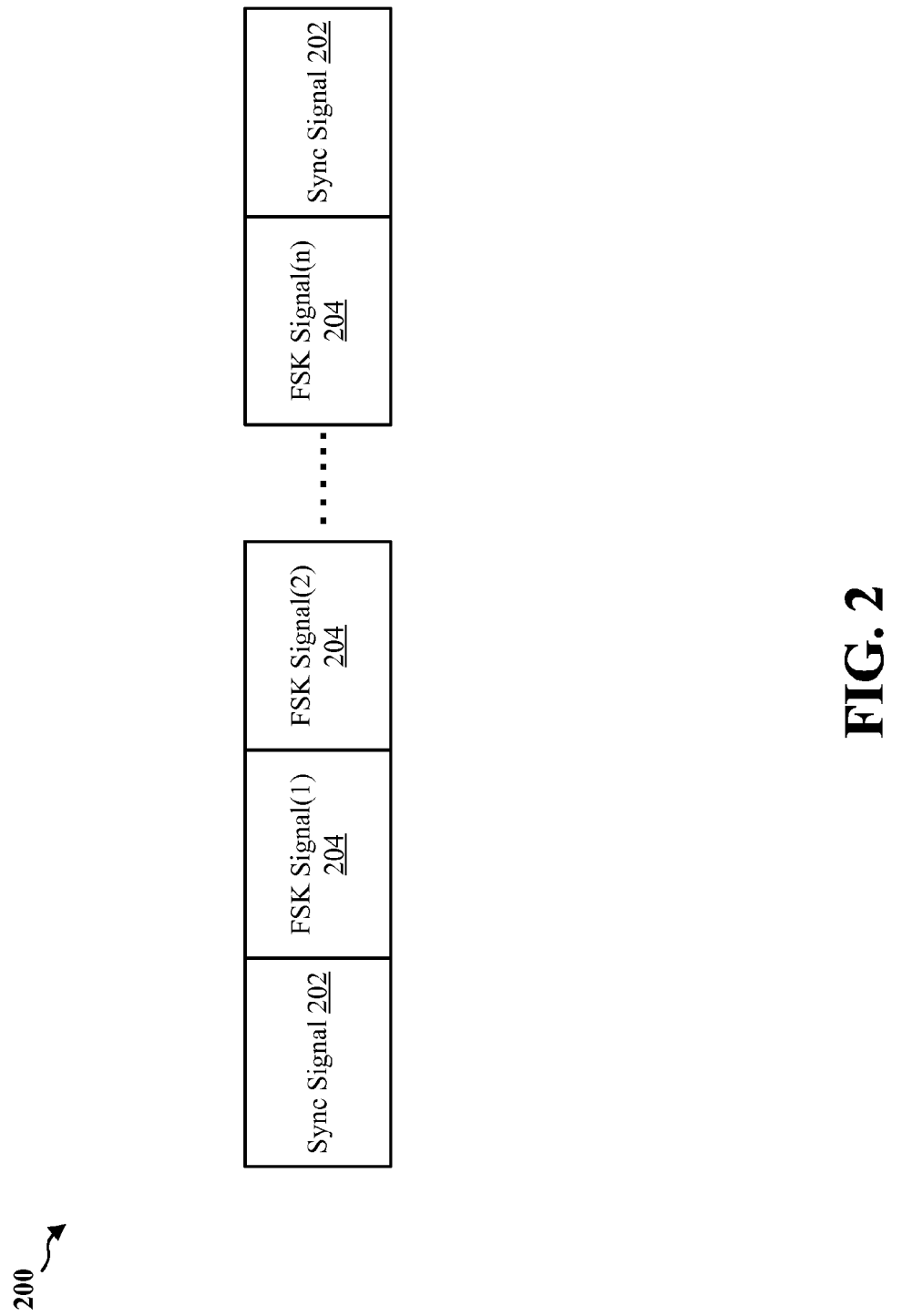
FIG. 2 is a diagram illustrating an exemplary frame structure for visible light communication.

FIG. 2 is a diagram 200 illustrating an exemplary frame structure for VLC. In an aspect, 30 frames of FSK symbols 204 may be preceded by a synchronization signal 202 which occupies a duration of one frame. In such an aspect, after transmission of the 31 frames is complete, the same set of signals may be transmitted again in the same sequence, but with a potentially different dimming level as input by a dimming controller (e.g., dimming controller 106). In general, the dimming input can be changed at every symbol boundary.

With respect to the FSK symbols 204, the VLC modulator/encoder central controller 104 may map the coded symbols (c1, c2, . . . , cn) (e.g., data 120) into a sequence of frequencies (f1, f2, . . . , fn) and/or in differences of frequencies (df1, df2, . . . , dfn). In such an aspect in which differential coding is used, an initial frequency (e.g., f0) may be fixed and known to the receiver, and may indicate to the receiver the start of the message (sequence of symbols). The VLC modulator/encoder central controller 104 may create a sequence of continuous square wave signals (s1($t$), s2($t$), . . . , sn(t)) each having a duration 1/frames per second (fps) where fps is the frame rate of the receiver (which may be known at the transmitter). In an aspect, the frequencies (f1, f2, . . . , fn) may all lie in an interval (e.g., 150 Hz to 10000 Hz). A lower bound of 150 Hz may be selected to prevent flickering as perceived by a human eye. An upper bound may be limited by the bandwidth of the receiver (e.g., rolling shutter of wireless device camera). Further, a duty cycle of each of the square waves (s1($t$), s2($t$), . . . , sn(t)) may be determined by the input 122 from the dimming controller 106 and may be in the interval [0, 1].

In an operational aspect, the frequency of s1($t$) is f1, the frequency of s2($t$) is f2, etc. In an operational aspect that uses a differential frequency scheme, the frequency of s1($t$) is f0, the frequency of s2($t$) is f0+df1, the frequency of s3($t$) is f0+df1+df2, etc. Further, in an operational aspect, a receiver associated with the wireless device 110 (e.g., a wireless device 110 equipped with an image sensor), detects the fundamental frequency of the square wave (e.g., using a fast Fourier transform (FFT)) and demodulates the frequencies back to corresponding codeword bits as dictated by a codebook. In an aspect, a resolution of approximately 10 Hz may be achieved in the frequency domain. In such an aspect, a data rate of log 2((10000−150)/10)=9.9 bits per frame may be achieved since each frame may carry a square wave having a duration equal to a frame time. Still further, in an aspect in which 30 frames are used for one message (e.g., data 120), a data rate of 297 bps may be achieved.

Figures 3A, 3B:
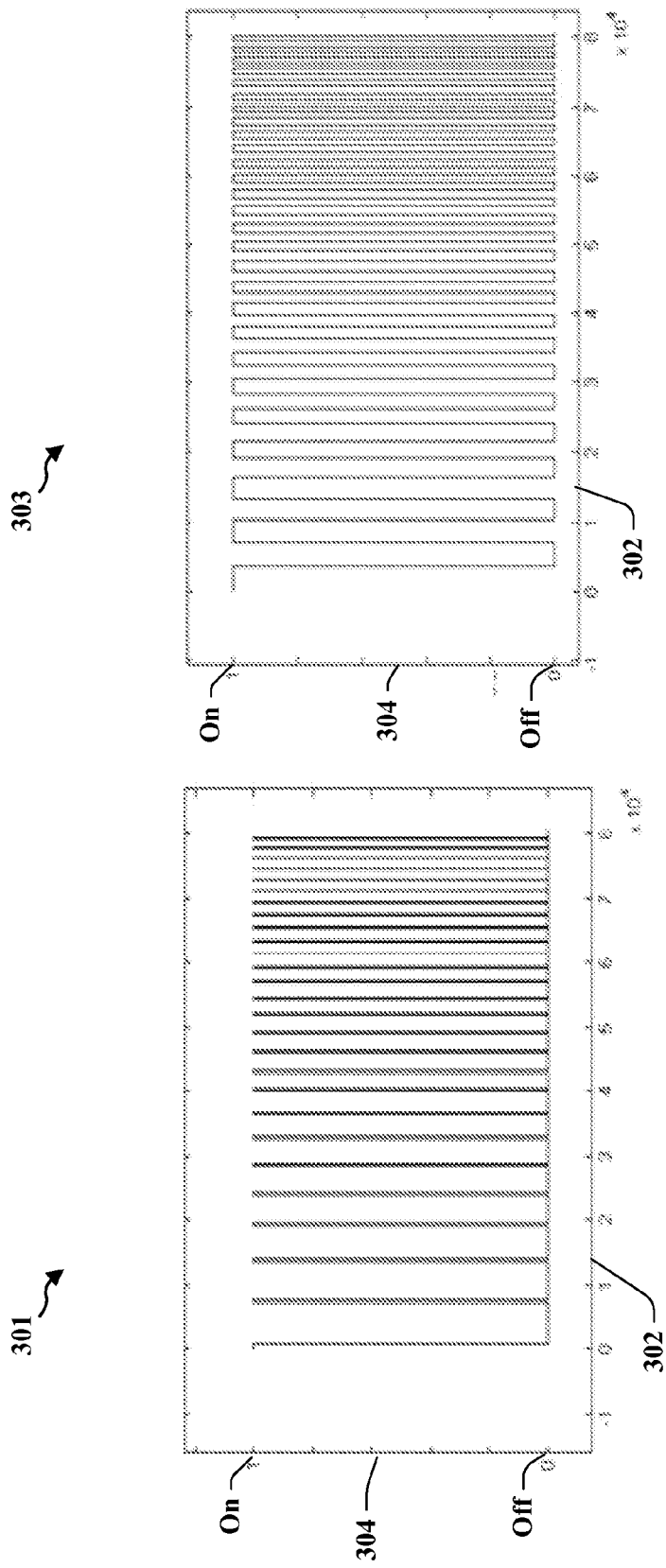
FIG. 3A is a diagram illustrating an example square wave synchronization signal with a first duty cycle.
FIG. 3B is a diagram illustrating an example square wave synchronization signal with a second duty cycle.

FIGS. 3A and 3B illustrate graphs (301, 303) of synchronization signals (e.g., synchronization signals 202) with different duty rates. Graphs 301 and 303 have an x-axis 302 indicating time and a y-axis 304 indicating whether the signal is in an "On" or "Off" position (e.g., "0" or "1"). Dimness constraints may be maintained by choosing a duty cycle of the square wave to be proportional to the requested dimness level. As noted above, the VLC modulator/encoder central controller 104 may use the dimness level input 122 and the message 120 to generate a signal (e.g., square wave) 124. The duty cycle of the square wave 124 may be determined by the dimness level 122. The frequency of the square wave 124 may be determined by the message 120. In an aspect, the relationship between the dimness level and duty cycle may be linear, logarithmic, etc. Graphs 301 and 303 illustrate how modulating the pulse width of the square wave changes the effective dimness level. For example, the average current/voltage level is proportional to the square wave duty cycle. Graphs 301 and 303 further illustrate how FSK modulation can be achieved while maintaining the desired dimness.

Graph 301 depicts a synchronization signal (e.g., synchronization signal 202) with a duty cycle of 10% (e.g., 10% dimming). Graph 303 depicts a synchronization signal with a duty cycle of 50% (e.g., 50% dimming).

The synchronization signal (e.g., synchronization signal 202) may be subject to the same dimming constraints as the FSK symbols (e.g., FSK symbol 204) and may also be "On-Off" modulated. In an aspect, the synchronization signal 202 selected may be a chirp sequence. Graphs 301 and 303 depict the synchronization signal as the chirp sequence. As used herein, a chirp is characterized by a rapidly changing frequency over time. For example, the signal s(t)=sin(2*pi*t* (kt+c)) is a chirp with a frequency that changes over time f(t)=kt+c for some constants k and c. Because the signals (synchronization signals 202, FSK symbols 204) are digital signals, the synchronization signal 202 changes between 0 and 1. In such an aspect, a sinusoidal chirp may be generated by quantizing the signal transmission as follows: round((s(t)+ 1)/2). Further, as noted above, the chirp sequence may be generated so that a frequency content is limited to between 150 Hz and 10000 Hz. One example of a chirp sequence is a Zadoff-Chu sequence where k=1 and c=1. The synchronization signal (e.g., synchronization signal 202) may be based on an instantaneous frequency of the chirp sequence that has been discretized into a finite set of levels (F1, F2, . . . , Fn). Further, the synchronization signal (e.g., synchronization signal 202) may be formed as a concatenation of pulses, each representing one cycle of a square wave of frequency (F1, F2, . . . , Fn). As depicted in graphs 301 and 303, the duty cycle of the pulses may be chosen according to a dimness level input (e.g., input 122).

Figure 4:
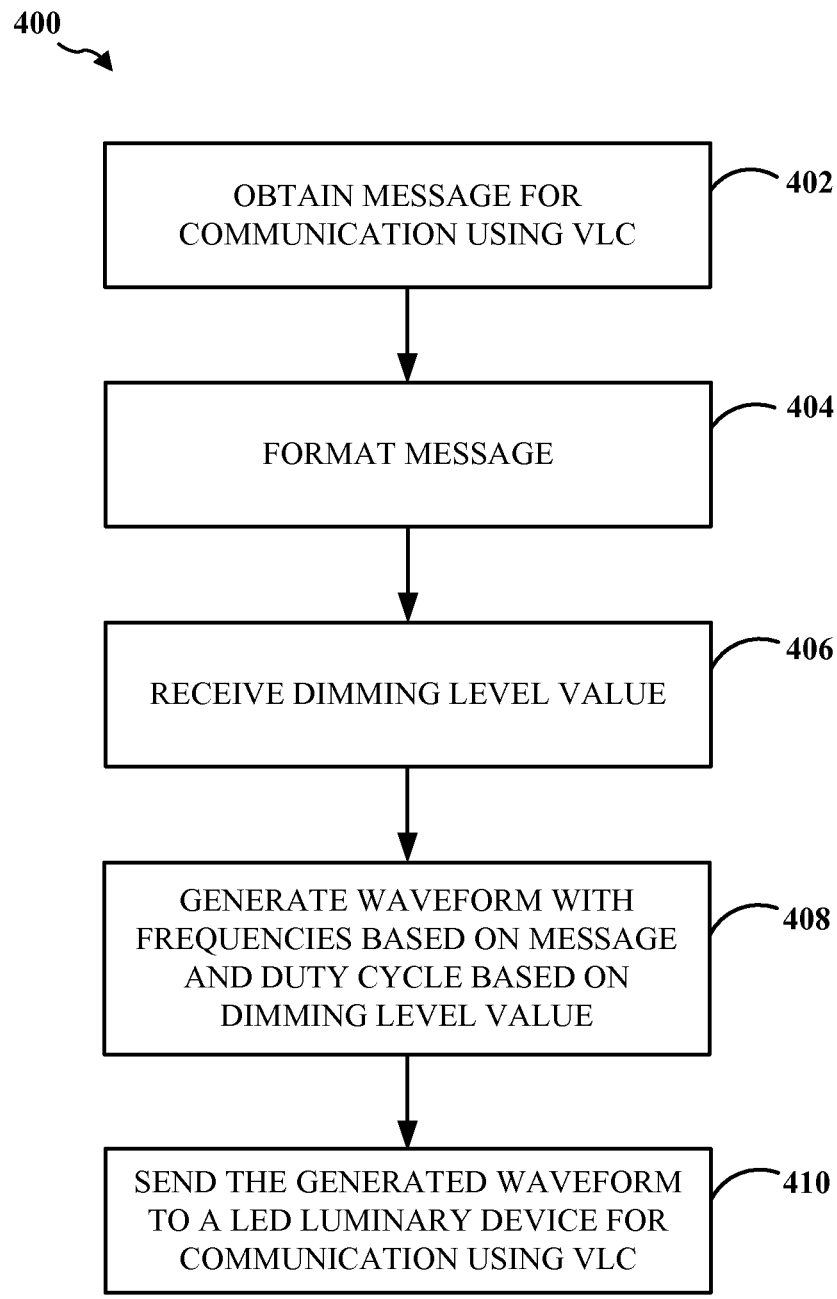
FIG. 4 is a flow chart of a method of wireless communication.

FIG. 4 is a flow chart 400 of a method of communication. The method may be performed by a VLC central controller (e.g., VLC modulator/encoder central controller 104).

As shown in FIG. 4, at block 402, the VLC central controller may obtain a message for communication using VLC through a light emitting diode (LED) luminary device. In an aspect, the message may be obtained from a network entity (e.g., a server, a LAN, Internet, etc.). In another aspect, the VLC central controller may obtain the message from an internal memory storage.

At block 404, the VLC central controller may format the message using a synchronization signal followed by one or more data signals. The synchronization signal and/or the one or more data signals may be modulated using a Frequency Shift Keying (FSK) modulation scheme. In an aspect, each of the one or more data signals may have a duration of 1/(frames per second (fps)) seconds, where fps is a frame rate of a receiver for receiving the one or more data signals.

At block 406, the VLC central controller may receive a dimming level input/value associated with a brightness of light to be emitted from the LED luminary device. In an aspect, a value for the brightness of light may be selected by a user via an external entity (e.g., wall-mounted dimmer or central controller that communicates with the LED luminary device via a wired connection, a wireless connection, or a device such as a smartphone that communicates directly with the LED luminary device). The brightness value may be manually set by the user or automatically set by a building automation system. In an aspect, the dimming level input/value may indicate a duty cycle to be used to achieve a desired requested dimness level (e.g., 10% duty cycle equals 10% dimming). In another aspect, the dimming level input/value and the duty cycle may be related through a linear, logarithmic, etc., relationship.

At block 408, the VLC central controller may generate a waveform with frequencies based on the formatted message and a duty cycle based on the dimming level input/value. In an aspect, the waveform may be a square wave. In an aspect, the frequencies may be between 150 Hz and 10000 Hz.

At block 410, the VLC central controller may send the generated waveform to the LED luminary device for communication using VLC.

Figure 5:
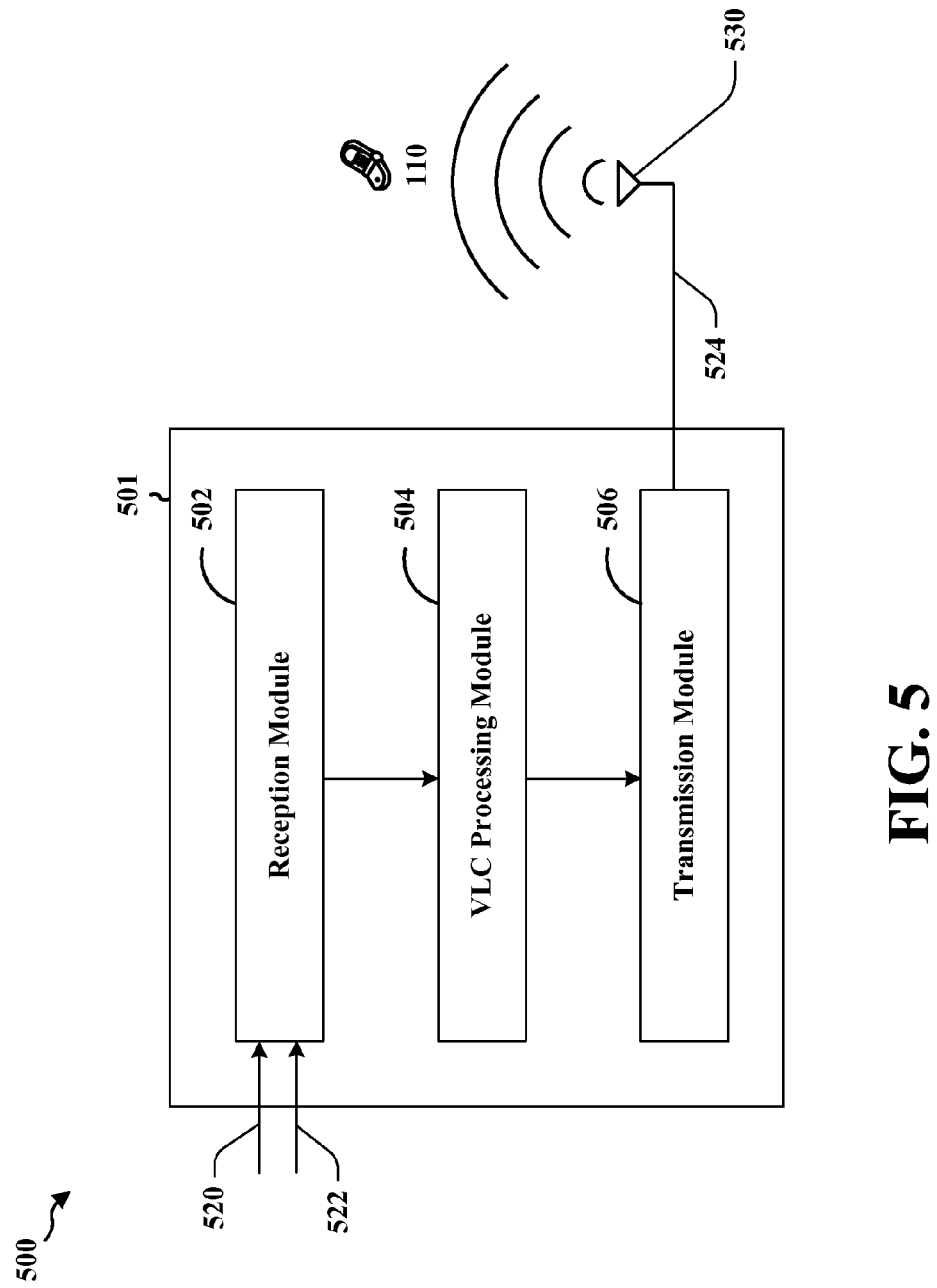
FIG. 5 is a conceptual data flow diagram illustrating the data flow between different modules/means/components in an exemplary apparatus.

FIG. 5 is a conceptual data flow diagram 500 illustrating the data flow between different modules/means/components in an exemplary apparatus 501. The apparatus 501 may be a VLC central controller (e.g., VLC modulator/encoder central controller 104). The apparatus 501 includes a reception module 502, a VLC processing module 504, and a transmission module 506.

The VLC processing module 504 may obtain (via the reception module 502) a message 520 for communication to a wireless device 110 using VLC through a light emitting diode (LED) luminary device 530. In an aspect, the message 520 may be obtained from a network entity (e.g., a server, a LAN, Internet, etc.). In another aspect, the message 520 may be obtained from an internal memory storage.

The VLC processing module 504 may format the message 520 using a synchronization signal followed by one or more data signals. The VLC processing module 504 may modulate the synchronization signal and/or the one or more data signals using a Frequency Shift Keying (FSK) modulation scheme. In an aspect, each of the one or more data signals may have a duration of 1/(frames per second (fps)) seconds, where fps is a frame rate of a receiver for receiving the one or more data signals.

The VLC processing module 504 may receive (via the reception module 502) a dimming level input/value 522 associated with a brightness of light to be emitted from the LED luminary device 530. In an aspect, a value for the brightness of light may be selected by a user via an external entity (e.g., wall-mounted dimmer or central controller that communicates with the LED luminary device 530 via a wired connection, a wireless connection, or a device such as a smartphone that communicates directly with the LED luminary device 530). The brightness value may be manually set by the user or automatically set by a building automation system. In an aspect, the dimming level input/value 522 may indicate a duty cycle to be used to achieve a desired requested dimness level (e.g. 10% duty cycle equals 10% dimming). In another aspect, the dimming level input/value 522 and the duty cycle may be related through a linear, logarithmic, etc., relationship.

The VLC processing module 504 may generate a waveform with frequencies based on the formatted message and a duty cycle based on the dimming level value 522. In an aspect, the waveform may be a square wave. In an aspect, the frequencies may be between 150 Hz and 10000 Hz. The VLC processing module 504 may then send (via the transmission module 506) the generated waveform 524 to the LED luminary device 530 for communication to the wireless device 110 using VLC.

The apparatus may include additional modules that perform each of the steps of the algorithm in the aforementioned flow chart of FIG. 4. As such, each step in the aforementioned flow chart of FIG. 4 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 6:
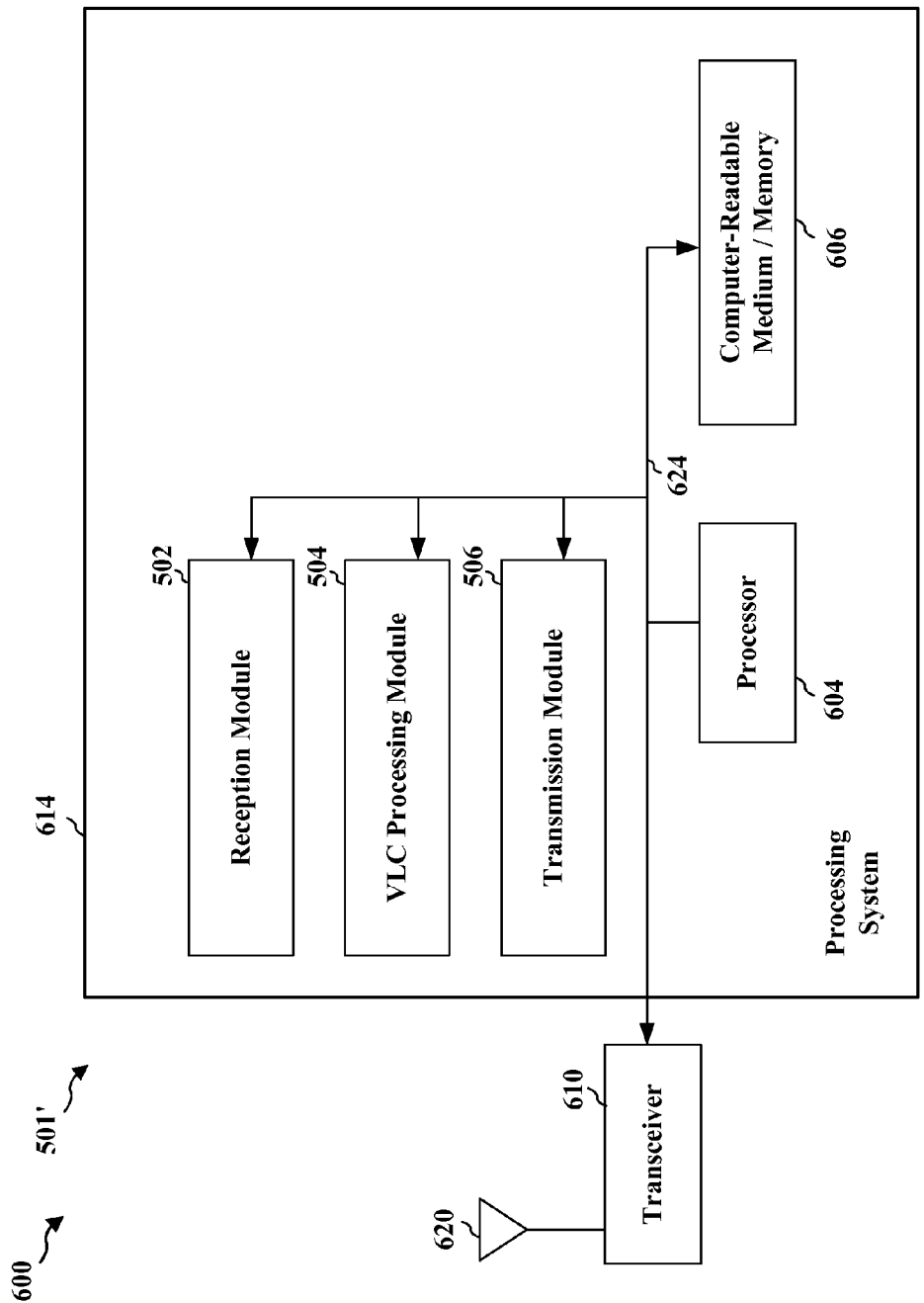
FIG. 6 is a diagram illustrating an example of a hardware implementation for an apparatus employing a processing system.

FIG. 6 is a diagram illustrating an example of a hardware implementation for an apparatus 501' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 604, the modules 502, 504, 506, and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas and/or pins 620. The transceiver 610 provides a means for communicating with various other apparatus over a transmission medium. The transceiver 610 receives a signal from the one or more antennas and/or pins 620, extracts information from the received signal, and provides the extracted information to the processing system 614, specifically the reception module 502. In addition, the transceiver 610 receives information from the processing system 614, specifically the transmission module 506, and based on the received information, generates a signal to be applied to the one or more antennas and/or pins 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the modules 502, 504, and 506. The modules may be software modules running in the processor 604, resident/stored in the computer readable medium 606, one or more hardware modules coupled to the processor 604, or some combination thereof.

In one configuration, the apparatus 501/501' for wireless communication includes means for obtaining a message for communication using VLC through a LED luminary device, means for formatting the message using a synchronization signal followed by one or more data signals, wherein the synchronization signal and/or the one or more data signals are modulated using a Frequency Shift Keying (FSK) modulation scheme, means for receiving a dimming level value associated with a brightness of light to be emitted from the LED luminary device, means for generating a waveform with frequencies based on the formatted message and a duty cycle for the LED luminary device based on the dimming level value, and means for sending the generated waveform to the LED luminary device for communication using VLC. The aforementioned means may be one or more of the aforementioned modules of the apparatus 501 and/or the processing system 614 of the apparatus 501' configured to perform the functions recited by the aforementioned means.

Figure 7:
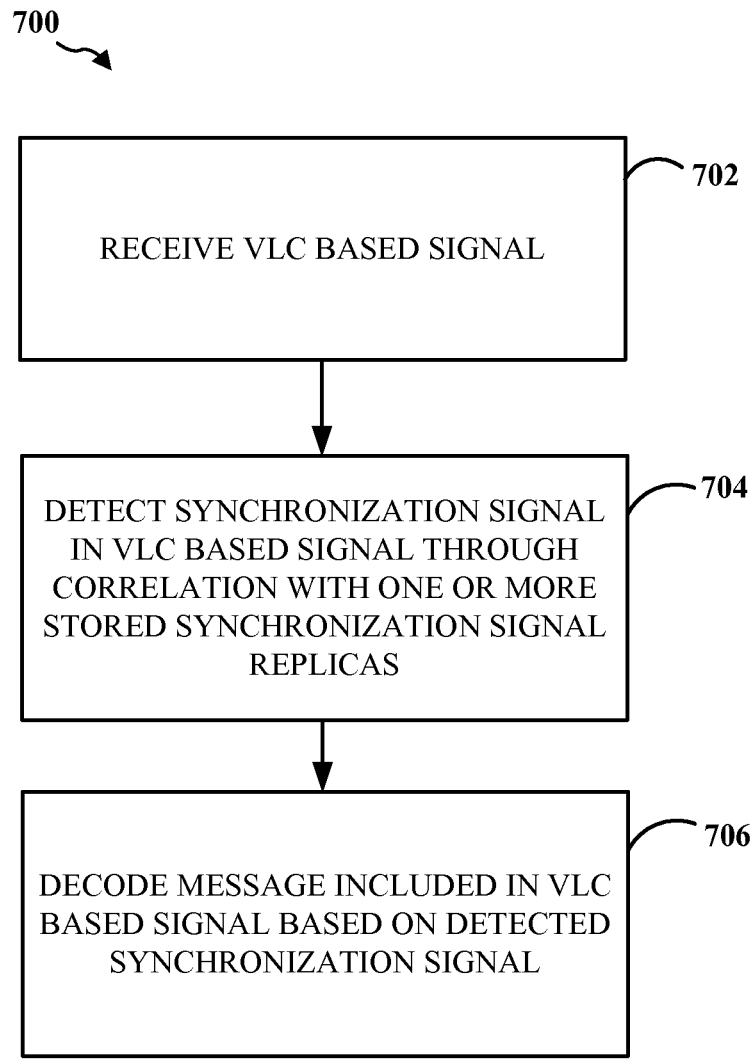
FIG. 7 is a flow chart of a method of wireless communication.

FIG. 7 is a flow chart 700 of a method of wireless communication. The method may be performed by a wireless device (e.g., wireless device 110). As shown in FIG. 7, at block 702, the wireless device may receive a VLC based signal from a light emitting diode (LED) luminary device. In an aspect, the VLC based signal may be within a frequency range between 120 Hz and 10000 Hz. In another aspect, the wireless device may receive the VLC based signal using a CMOS image sensor using a rolling shutter.

At block 704, the wireless device may detect a synchronization signal in the VLC based signal through correlation with one or more stored synchronization signal replicas. In an aspect, each of the stored synchronization signal replicas may correspond to a different dimming level. In another aspect, there are less than 100 different synchronization signal replicas against which to correlate the synchronization signal. The correlation may be performed in a frequency domain.

At block 706, the wireless device may decode a message included in the VLC based signal based on the detected synchronization signal. In an aspect, the message is formatted with the synchronization signal followed by one or more data signals. The synchronization signal and/or the one or more data signals may be modulated using a Frequency Shift Keying (FSK) modulation scheme. In an aspect, each of the one or more data signals may have a duration of 1/(frames per second (fps)) seconds, where fps is a frame rate of the wireless device for receiving the one or more data signals. In an aspect, the message may include a medium access control (MAC) address identifying a location (e.g., room, venue), service (e.g., merchant information, coupons), etc., associated with the LED luminary device.

Figure 8:
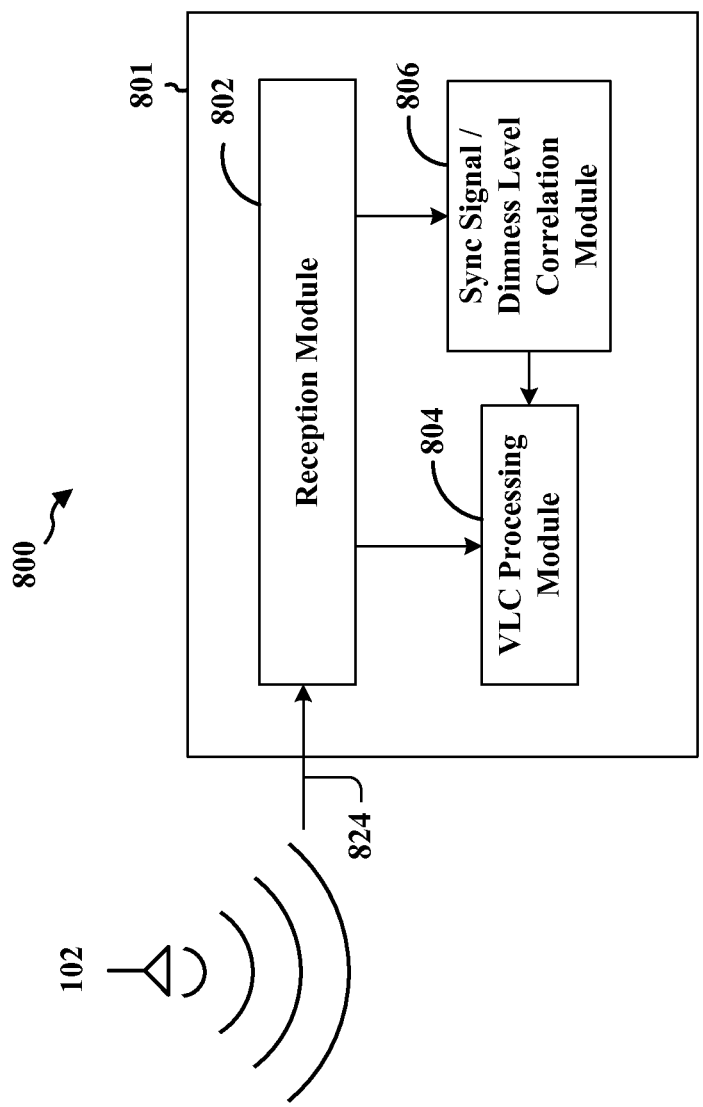
FIG. 8 is a conceptual data flow diagram illustrating the data flow between different modules/means/components in an exemplary apparatus.

FIG. 8 is a conceptual data flow diagram 800 illustrating the data flow between different modules/means/components in an exemplary apparatus 801. The apparatus 801 may be a wireless device (e.g., wireless device 110). The apparatus 801 includes a reception module 802, a VLC processing module 804, and a sync signal/dimness level correlation module 806.

The reception module 802 may receive a VLC based signal 824 from a light emitting diode (LED) luminary device 102. In an aspect, the VLC based signal may be within a frequency range between 120 Hz and 10000 Hz. In another aspect, the reception module 802 may receive the VLC based signal 824 using a CMOS image sensor using a rolling shutter.

The sync signal/dimness level correlation module 806 receives the VLC based signal 824 from the reception module 802. The sync signal/dimness level correlation module 806 may detect a synchronization signal in the VLC based signal 824 through correlation with one or more stored synchronization signal replicas. In an aspect, each of the stored synchronization signal replicas may correspond to a different dimming level. In another aspect, there are less than 100 different synchronization signal replicas against which to correlate the synchronization signal. The correlation may be performed in a frequency domain.

The VLC processing module receives the VLC based signal 824 from the reception module 802. The VLC processing module 804 may decode a message included in the VLC based signal 824 based on the synchronization signal detected by the sync signal/dimness level correlation module 806. In an aspect, the message is formatted using the synchronization signal followed by one or more data signals. The synchronization signal and/or the one or more data signals may be modulated using a Frequency Shift Keying (FSK) modulation scheme. In an aspect, each of the one or more data signals may have a duration of 1/(frames per second (fps)) seconds, where fps is a frame rate of the apparatus 801 for receiving the one or more data signals. In an aspect, the message may include a medium access control (MAC) address identifying a location (e.g., room, venue), service (e.g., merchant information, coupons), etc., associated with the LED luminary device 102.

The apparatus may include additional modules that perform each of the steps of the algorithm in the aforementioned flow chart of FIG. 7. As such, each step in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
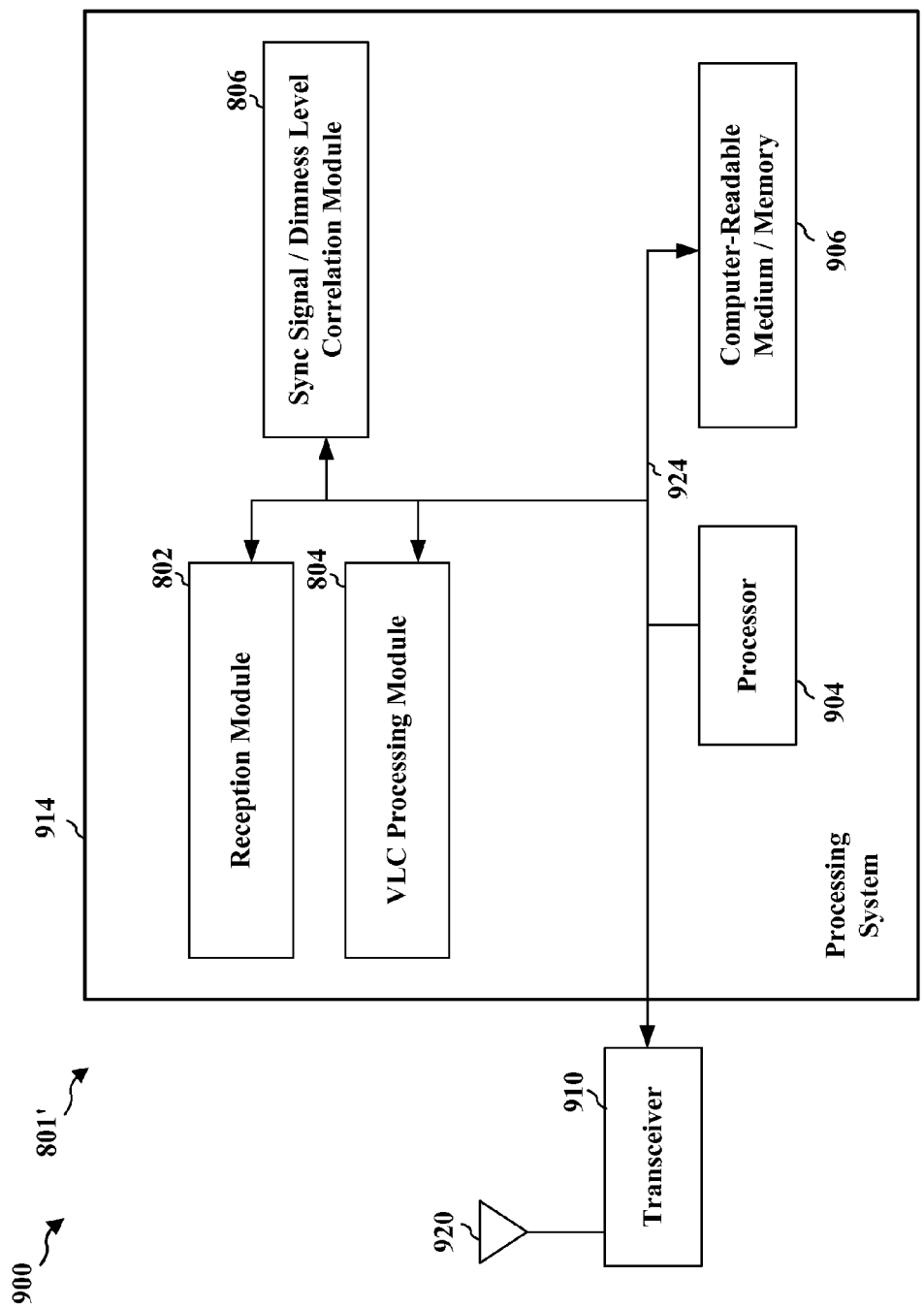
FIG. 9 is a diagram illustrating an example of a hardware implementation for an apparatus employing a processing system.

FIG. 9 is a diagram illustrating an example of a hardware implementation for an apparatus 801' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 802, 804, 806, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 614, specifically the reception module 802. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the modules 802, 804, and 806. The modules may be software modules running in the processor 904, resident/stored in the computer readable medium/memory 906, one or more hardware modules coupled to the processor 904, or some combination thereof.

In one configuration, the apparatus 110/110' for wireless communication includes means for receiving a visible light communication (VLC) based signal from a light emitting diode (LED) luminary device, means for detecting a synchronization signal in the VLC based signal through correlation with one or more stored synchronization signal replicas, and means for decoding a message included in the VLC based signal based on the detected synchronization signal, wherein the message is formatted using the synchronization signal followed by one or more data signals, and wherein the synchronization signal and/or the one or more data signals are modulated using a Frequency Shift Keying (FSK) modulation scheme. The aforementioned means may be one or more of the aforementioned modules of the apparatus 801 and/or the processing system 914 of the apparatus 801' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. The word "exemplary" is used herein to mean "serving as an example, instance, or illustration." Any aspect described herein as "exemplary" is not necessarily to be construed as preferred or advantageous over other aspects." Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communication, comprising:
   obtaining a message for communication using visible light communication (VLC) through a light emitting diode (LED) luminary device;
   formatting the message using a synchronization signal followed by one or more data signals, wherein the one or more data signals are modulated using a Frequency Shift Keying (FSK) modulation scheme;
   receiving a first dimming level value associated with a first brightness of light to be emitted from the LED luminary device for the communication using VLC and a second dimming level value associated with a second brightness of light to be emitted from the LED luminary device for the communication using VLC;
   generating a first waveform with frequencies based on the formatted message and a first duty cycle for the LED luminary device based on the first dimming level value;
   sending the generated first waveform to the LED luminary device for the communication using VLC;
   generating a second waveform with frequencies based on the formatted message and a second duty cycle for the LED luminary device based on the second dimming level value; and
   sending the generated second waveform to the LED luminary device for the communication using VLC.

2. The method of claim 1, wherein the message is obtained from a network entity.

3. The method of claim 1, wherein the message is obtained from an internal memory storage associated with a VLC central controller.

4. The method of claim 1, wherein the first dimming level value and the first duty cycle are related either linearly or logarithmically.

5. The method of claim 1, wherein the first waveform is a square wave.

6. The method of claim 1, wherein the frequencies are within a range of 150 Hz to 10000 Hz.

7. The method of claim 1, wherein each of the one or more data signals has a duration of 1/(frames per second (fps)) seconds, where fps is a frame rate of a receiver for receiving the one or more data signals.

8. The method of claim 1, wherein the synchronization signal is modulated using the FSK modulation scheme.

9. An apparatus for communication, comprising:
   means for obtaining a message for communication using visible light communication (VLC) through a light emitting diode (LED) luminary device;
   means for formatting the message using a synchronization signal followed by one or more data signals, wherein the one or more data signals are modulated using a Frequency Shift Keying (FSK) modulation scheme;
   means for receiving a first dimming level value associated with a first brightness of light to be emitted from the LED luminary device for the communication using VLC and a second dimming level value associated with a second brightness of light to be emitted from the LED luminary device for the communication using VLC;
   means for generating a first waveform with frequencies based on the formatted message and a first duty cycle for the LED luminary device based on the first dimming level value;
   means for sending the generated first waveform to the LED luminary device for the communication using VLC;
   means for generating a second waveform with frequencies based on the formatted message and a second duty cycle for the LED luminary device based on the second dimming level value; and means for sending the generated second waveform to the LED luminary device for the communication using VLC.

10. The apparatus of claim 9, wherein the message is obtained from a network entity or an internal memory storage associated with a VLC central controller.

11. The apparatus of claim 9, wherein the second dimming level value and the second duty cycle are related either linearly or logarithmically.

12. The apparatus of claim 9, wherein the second waveform is a square wave.

13. The apparatus of claim 9, wherein the frequencies are within a range of 150 Hz to 10000 Hz.

14. The apparatus of claim 9, wherein each of the one or more data signals has a duration of 1/(frames per second (fps)) seconds, where fps is a frame rate of a receiver for receiving the one or more data signals.

15. The apparatus of claim 9, wherein the synchronization signal is modulated using the FSK modulation scheme.

16. An apparatus for communication, comprising:
a memory; and
at least one processor coupled to the memory and configured to:
obtain a message for communication using visible light communication (VLC) through a light emitting diode (LED) luminary device;
format the message using a synchronization signal followed by one or more data signals, wherein the one or more data signals are modulated using a Frequency Shift Keying (FSK) modulation scheme;
receive a first dimming level value associated with a first brightness of light to be emitted from the LED luminary device for the communication using VLC and a second dimming level value associated with a second brightness of light to be emitted from the LED luminary device for the communication using VLC;
generate a first waveform with frequencies based on the formatted message and a first duty cycle for the LED luminary device based on the first dimming level value;
send, via a transmission module, the generated first waveform to the LED luminary device for the communication using VLC;
generate a second waveform with frequencies based on the formatted message and a second duty cycle for the LED luminary device based on the second dimming level value; and
send, via the transmission module, the generated second waveform to the LED luminary device for the communication using VLC.

17. The apparatus of claim 16, wherein the message is obtained from a network entity.

18. The apparatus of claim 16, wherein the message is obtained from an internal memory storage associated with a VLC central controller.

19. The apparatus of claim 16, wherein the first dimming level value and the first duty cycle are related either linearly or logarithmically.

20. The apparatus of claim 16, wherein the first waveform is a square wave.

21. The apparatus of claim 16, wherein the frequencies are within a range of 150 Hz to 10000 Hz.

22. The apparatus of claim 16, wherein each of the one or more data signals has a duration of 1/(frames per second (fps)) seconds, where fps is a frame rate of a receiver for receiving the one or more data signals.

23. The apparatus of claim 16, wherein the synchronization signal is modulated using the FSK modulation scheme.

24. A non-transitory computer-readable medium storing computer executable code for communication, comprising code for:
obtaining a message for communication using visible light communication (VLC) through a light emitting diode (LED) luminary device;
formatting the message using a synchronization signal followed by one or more data signals, wherein the one or more data signals are modulated using a Frequency Shift Keying (FSK) modulation scheme;
receiving a first dimming level value associated with a first brightness of light to be emitted from the LED luminary device for the communication using VLC and a second dimming level value associated with a second brightness of light to be emitted from the LED luminary device for the communication using VLC;
generating a first waveform with frequencies based on the formatted message and a first duty cycle for the LED luminary device based on the first dimming level value;
sending the generated first waveform to the LED luminary device for the communication using VLC;
generating a second waveform with frequencies based on the formatted message and a second duty cycle for the LED luminary device based on the second dimming level value; and
sending the generated second waveform to the LED luminary device for the communication using VLC.

25. The non-transitory computer-readable medium of claim 24, wherein the synchronization signal is modulated using the FSK modulation scheme.

* * * * *